United States Patent

Marovac

[11] Patent Number: 5,241,474
[45] Date of Patent: Aug. 31, 1993

[54] METHOD OF COMPOSING SIGNATURES

[75] Inventor: Nenad Marovac, La Jolla, Calif.

[73] Assignee: Xerox Corporation, Stamford, Conn.

[21] Appl. No.: 770,799

[22] Filed: Oct. 2, 1991

[51] Int. Cl.[5] .......................... G06F 15/38; G03B 27/32
[52] U.S. Cl. .................................. 364/419.01; 355/24; 355/77
[58] Field of Search ................ 364/419; 355/7, 14 R, 355/14 SH, 77

[56] References Cited

U.S. PATENT DOCUMENTS

| | | | |
|---|---|---|---|
| 4,334,765 | 6/1982 | Clark | 355/8 |
| 4,538,905 | 9/1985 | Griego et al. | 355/14 |
| 4,708,469 | 11/1987 | Bober et al. | 355/77 |
| 4,727,402 | 2/1988 | Smith | 355/14 |
| 4,731,637 | 3/1988 | Acquaviva et al. | 355/24 |
| 4,745,441 | 5/1988 | Maruta et al. | 355/7 |
| 4,789,147 | 12/1988 | Berger et al. | 270/1.1 |
| 4,789,879 | 12/1988 | Murakami | 355/14 R |
| 4,809,039 | 2/1989 | Ishii | 355/14 R |
| 4,814,822 | 3/1989 | Acquaviva et al. | 355/14 SH |
| 4,819,029 | 4/1989 | Ito | 355/7 |
| 4,891,681 | 1/1990 | Fiske et al. | 355/322 |

Primary Examiner—Roy N. Envall, Jr.
Assistant Examiner—Frantzy Poinvil
Attorney, Agent, or Firm—Daniel J. O'Neill

[57] ABSTRACT

The present invention provides a method of electronic composition for electronically ordering logical pages onto physical pages printed by a printer. The first step is to determine the number of physical pages in a signature, and the pattern in which two or more logical pages will be imposed on the physical page. Based on the pattern, a seed table is selected having an entry for each position of the pattern. The logical pages are then electronically ordered by assigning a logical page to each position of each physical page based on the place of each physical page in the sequence of physical pages and based on the entry in the seed table corresponding to the pattern position contemplated.

1 Claim, 5 Drawing Sheets

FIG. 5
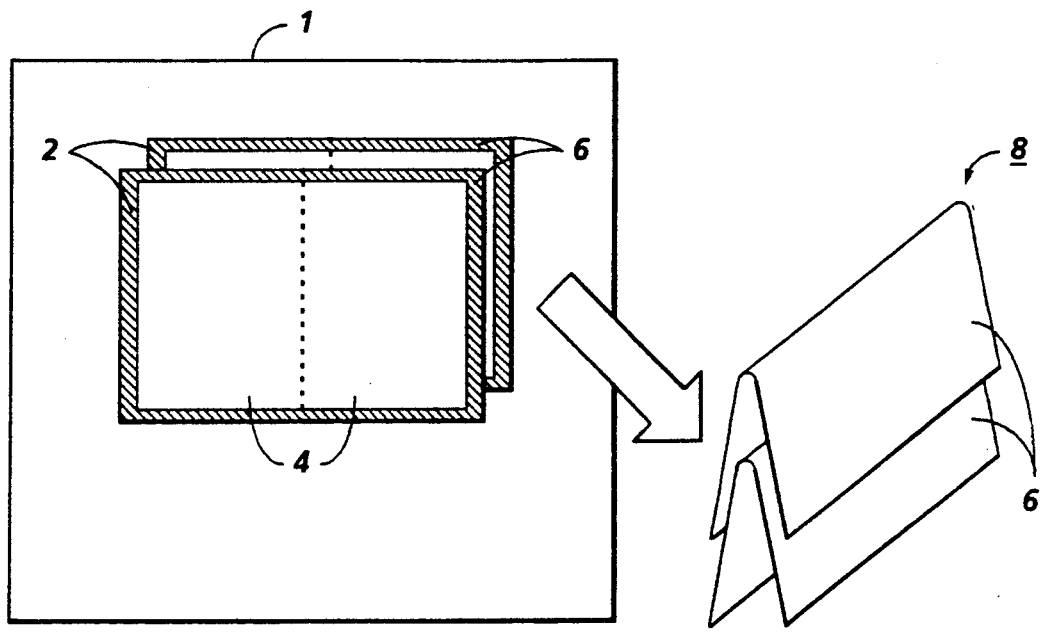
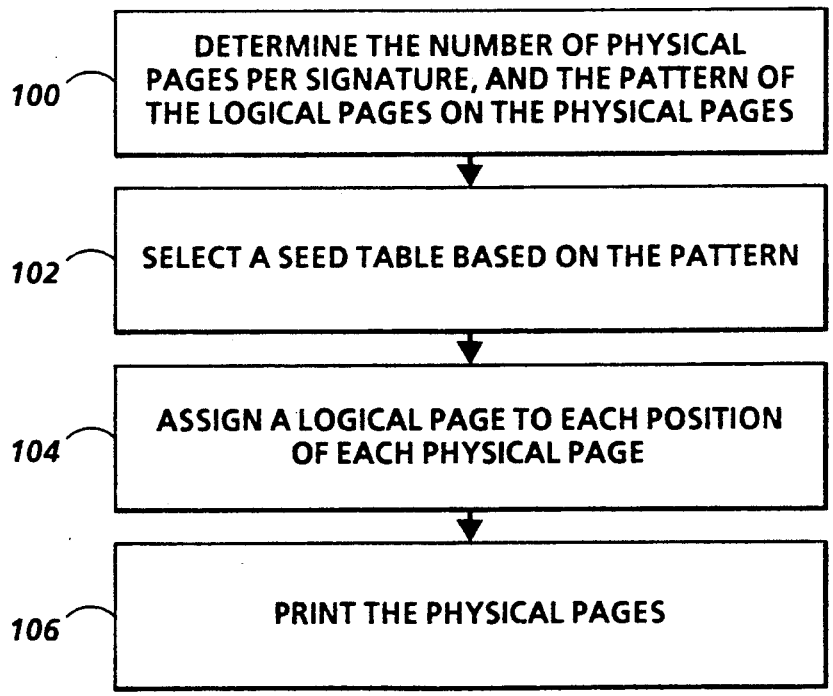
FIG. 6

METHOD OF COMPOSING SIGNATURES

BACKGROUND

This invention relates to electronic composition, and more particularly to a method of composing signatures.

The raw materials of electronic composition are text and image data that have not been paginated or otherwise composed. The electronic composition process groups or paginates the data as logical pages, with one or more logical pages destined to be printed by a printer on a physical page. After printing, the physical pages will be folded and assembled into signatures.

Present methods of electronic composition determine how to print two or more logical pages in sequence on each physical page by consulting look-up tables, stored in memory. These look-up tables are little more than electronic versions of the tables, derived empirically, that offset printers have used for years to manually compose signatures on offset presses. While generally adequate for electronic composition, look-up tables are inflexible and cumbersome, requiring unique entries for each possible combination of number of physical pages and pattern of logical pages on each physical page.

SUMMARY OF THE INVENTION

The present invention provides a method of electronic composition for electronically ordering logical pages onto physical pages printed by a printer. The first step is to determine the number of physical pages in a signature, and the pattern in which two or more logical pages will be imposed on the physical pages. Based on the pattern, a seed table is selected having an entry for each position of the pattern. The logical pages are then electronically ordered by assigning a logical page to each position of each physical page based on the place of each physical page in the sequence of physical pages and based on the entry in the seed table corresponding to the pattern position contemplated. The step of assigning logical pages to the positions of physical pages includes the step of determining whether the corresponding seed table entry is positive, and assigning logical pages based on the following algorithm:

Positive Entry: Logical Page =

Entry * (total number of physical pages/signature) −

(number of physical pages following the current physical page in sequence);

Else:

Logical Page = abs(Entry) * (total number of physical pages/signature) −

(number of physical pages preceding the current physical page in sequence).

BRIEF DESCRIPTION OF THE DRAWINGS

FIG. 5 is a schematic diagram showing a printer performing the two-up signature printing of the example in FIGS. 1 and 2; and FIG. 6 is a flow chart describing the steps used to implement the method of the present invention for the examples as shown in FIGS. 1 through 5.

DETAILED DESCRIPTION OF THE PREFERRED EMBODIMENT

While the present invention will hereinafter be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
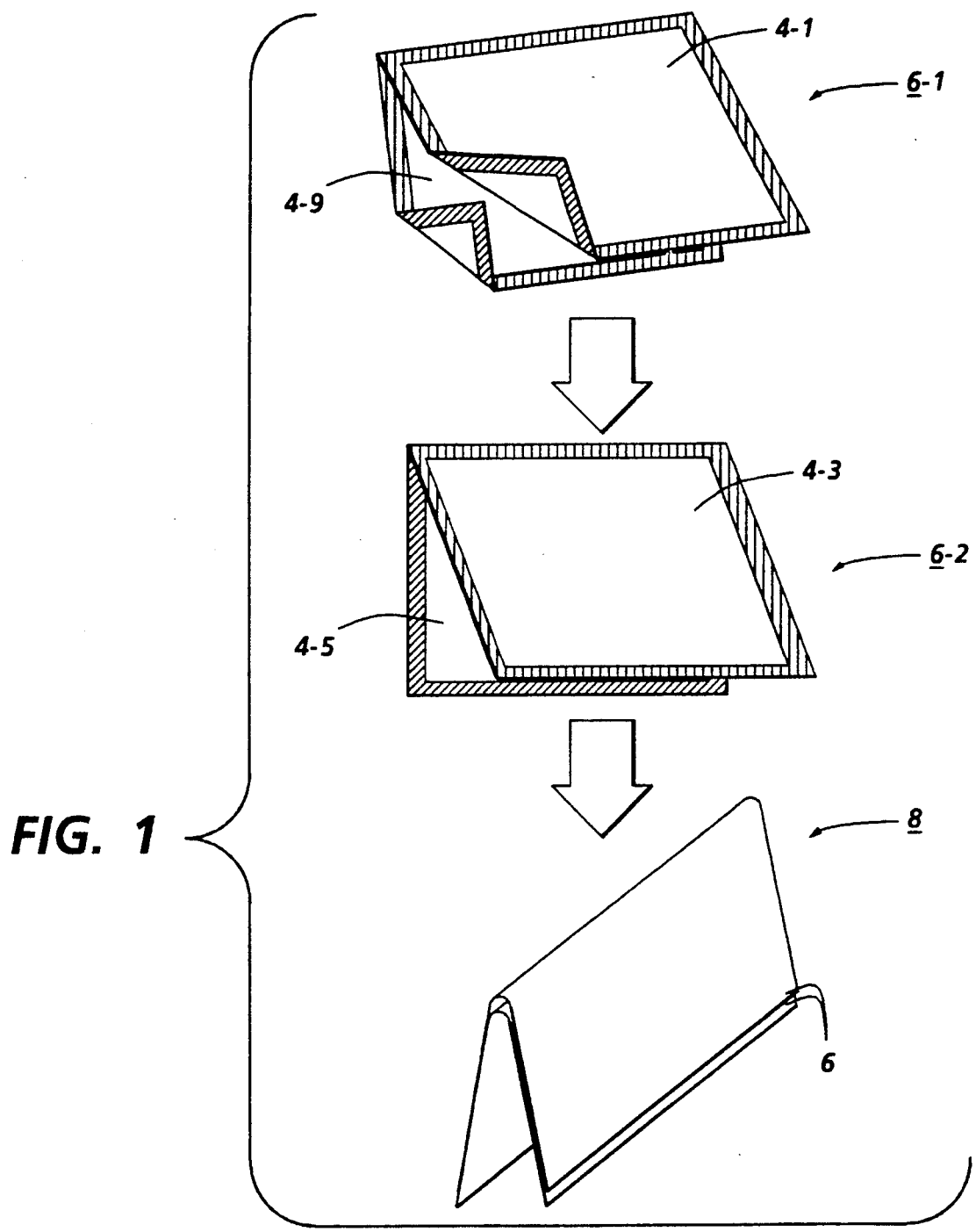
FIG. 1 is an isometric view of an example of two-up signature printing formed by the method of the present invention, with two folded paper sheets being nested to form a signature.
Figure 2:
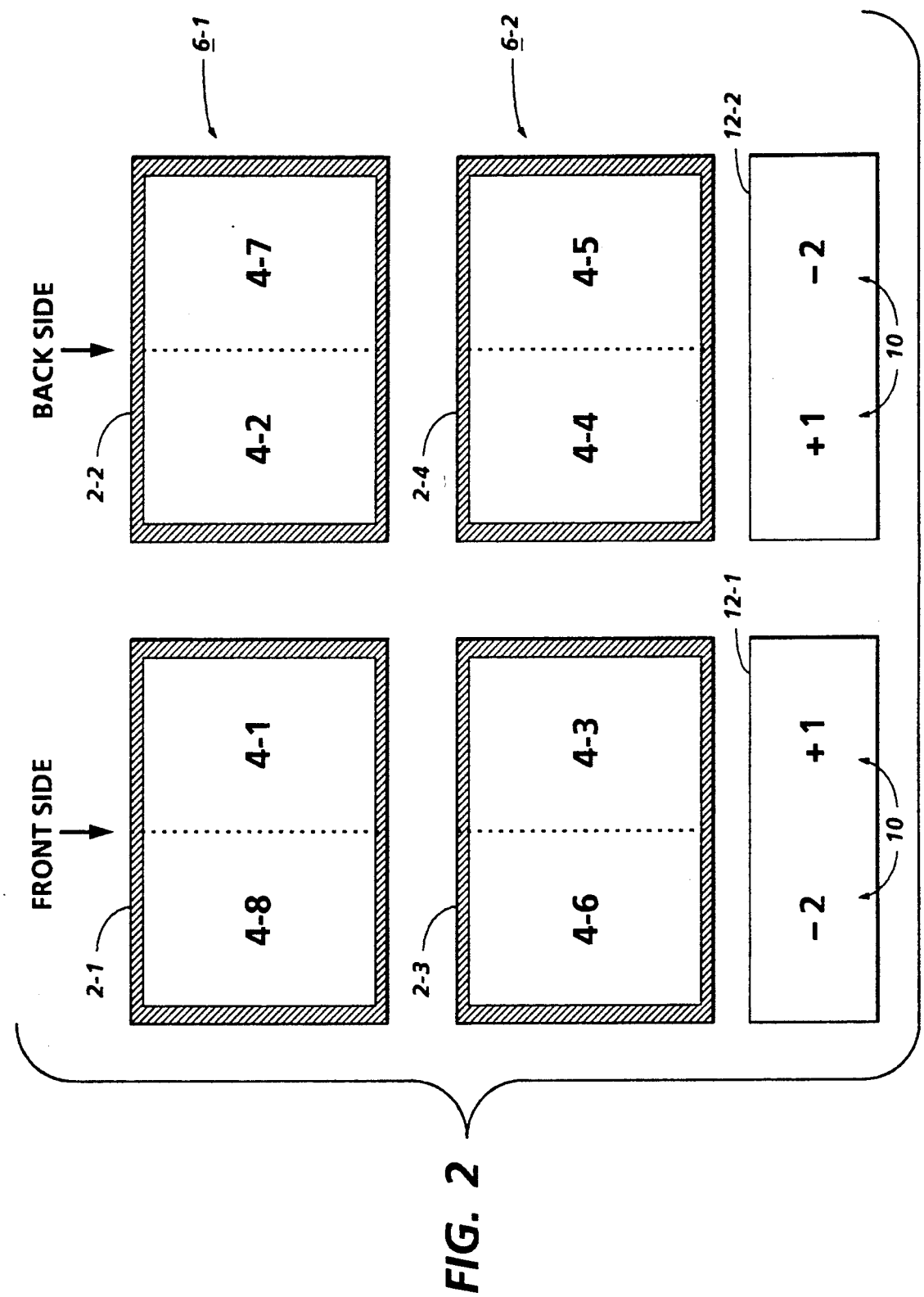
FIG. 2 is a schematic diagram illustrating the seed table and assignment of logical pages onto physical pages for the example of FIG. 1.

Referring now to FIGS. 1, 2, and 5 there is shown an example of two-up signature composition: eight logical pages 4 are assigned positions on four physical pages 2. Two logical pages 4 are positioned in a side by side pattern on each physical page 2. One physical page 2 constitutes a side (i.e., front or back side) of a paper sheet 6. Of course, sheet 6 could be any medium suitable for receiving print (e.g., plastic). After a printer (not shown) prints logical pages 4 onto physical pages 2, paper sheets 6 will be folded and assembled as shown in FIG. 1 to form a signature 8.

In accordance with the invention, the logical pages 4 are assigned to physical pages 2 based on the place of each physical page 2 in the sequence of physical pages 2 and based on an entry 10 in a seed table 12. Seed table 12 has a pattern of entries 10 that matches the pattern of positions of logical pages 4 on a physical pages 2. The entry 10 used is the one that corresponds to the position of the logical page 4 on the physical page 2. Moreover, each seed table 12 consists of a front seed table 12-1 and a back seed table 12-2, to be used with physical pages 2 that are positioned on the front and back sides, respectively, of a paper sheet 6. In particular, the method of the invention determines the logical page 4 that should be assigned to a particular position on a physical page 2 y first determining whether the corresponding seed table entry 10 is positive, and then performing the following calculation:

Positive Entry: Logical Page =

Entry * (total number of physical pages/signature) −

(number of physical pages following the current physical page in sequence);

Else:

Logical Page = abs(Entry) * (total number of physical pages/signature) −

(number of physical pages preceding the current physical page

For example, the logical pages 4 assigned to the front physical page 2-1 of the first paper sheet 6-1 are determined as follows, using front seed table 12-1:

| | |
|---|---|
| LEFT POSITION | Logical page = abs(−2) * 4 − 0 = 8, for logical page 4-8; and |
| RIGHT POSITION | Logical page = (+1) * 4 − 3 = 1, for logical page 4-1. |

Figure 3:
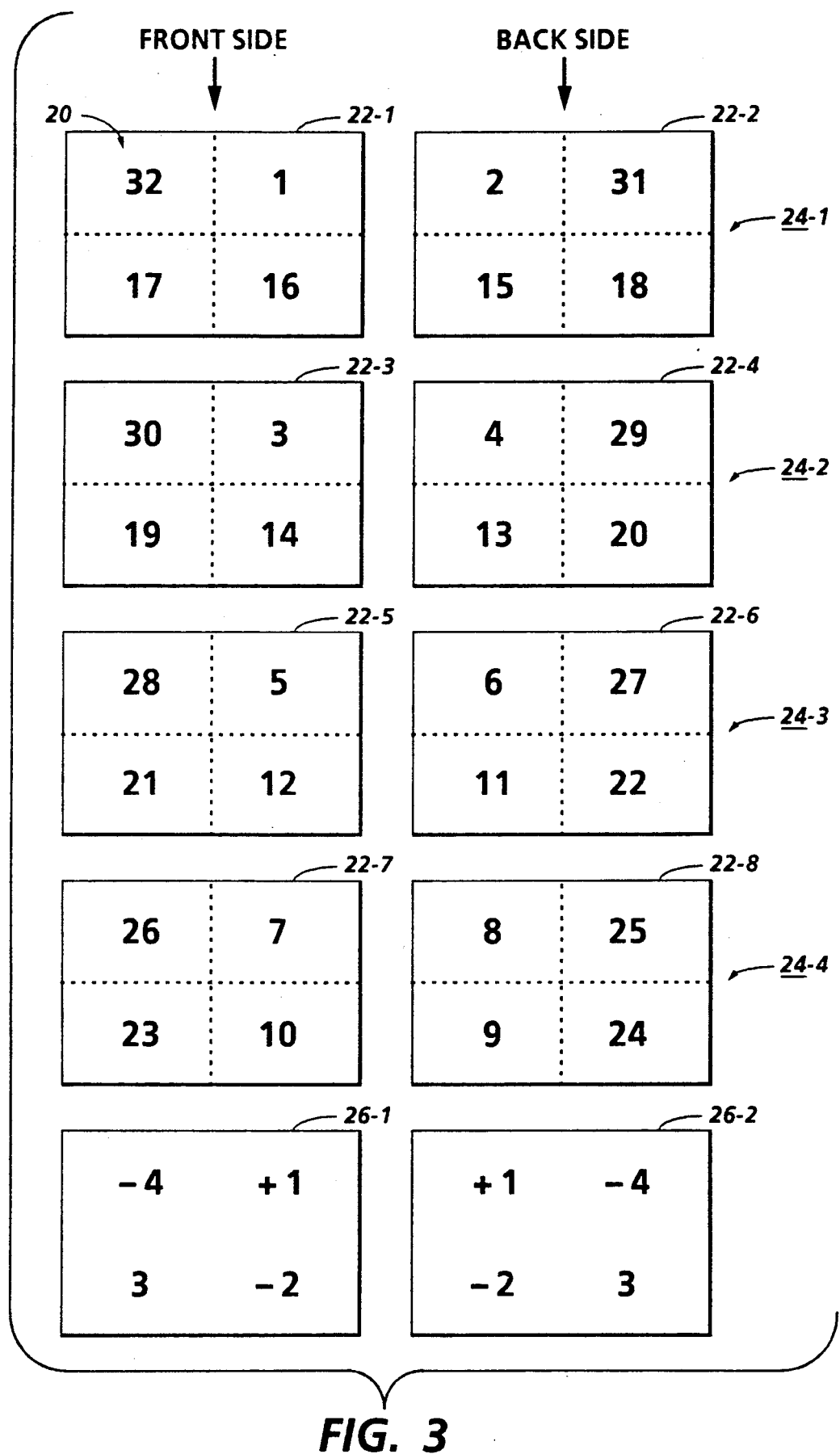
FIG. 3 is a schematic diagram showing a first example of four-up signature printing according to the method of present invention.

Referring now to FIG. 3, there is shown an example of four-up signature printing in which four logical pages 20 are positioned on each of eight physical pages 22. The physical pages 22 are part of four paper sheets 24. Logical pages 20 are assigned to physical pages 22 using the above equation together with seed table 26. Paper sheets 24 are assemble and folded to form a signature (not shown) by first stacking the paper sheets 24 in order from top to bottom with paper sheet 24-1 having physical page 22-1 on top, and with paper sheet 24-4 having physical sheet 22-8 on bottom. Then the stack of paper sheets 24 is folded horizontally downward, leaving logical pages 20-32 and 20-1 of physical page 22-1 on top. Finally, the stack of paper sheets 24 is folded vertically, leaving logical page 20-1 on top as the first logical page 20, and leaving logical page 20-32 on bottom as the last logical page 20.

Figure 4:
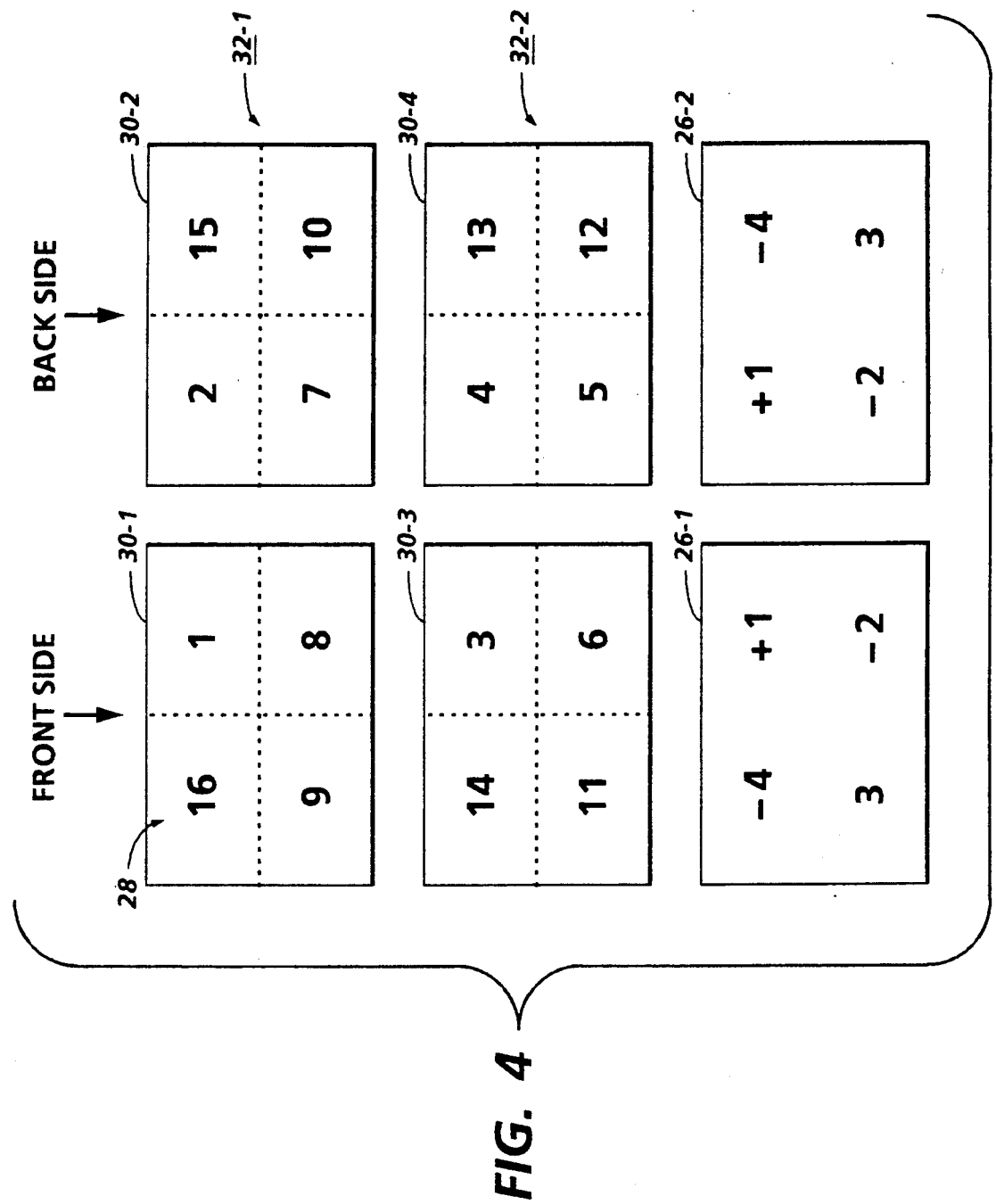
FIG. 4 is a schematic diagram showing a second example of four-up signature printing according to the method of present invention.

Referring now to FIG. 4, the utility of the method of the invention is shown by another example of four-up signature printing. Here, four logical pages 28 are positioned on each of four physical pages 30. The physical pages 30 are part of two paper sheets 32. The same seed table 26 used in the example of FIG. 3 can be used, since the pattern of logical pages 28 on physical pages 30 is the same as the pattern of logical pages 20 on physical pages 22, and since a signature (not shown) is to be formed by folding the paper sheets 32 in the same manner as paper sheets 24 were folded.

In recapitulation, referring now to FIGS. 1, 2, 5 and 6, the present invention provides a method for ordering logical pages onto physical pages. The first step 100 is to determine the number of physical pages 2 in a signature 8, and the pattern in which two or more logical pages 4 will be imposed on each physical page 2. Based on the pattern, in the next step 102 a seed table 12 is selected having an entry 10 for each position of the pattern. In step 104 the logical pages 4 are then ordered by assigning a logical page 4 to each position of each physical page 2 based on the place of each physical page 2 in the sequence of physical pages 2 and based on the entry 10 in the seed table 12 corresponding to the pattern position contemplated. Finally, in step 106 printer 1 prints logical pages 4 in the assigned positions on physical pages 2. As is well known to those skilled in the art, the method of the present invention operates in conjunction with a control program, which is a specific designed sequence of instructions that guides the computer (not shown) of printer 1 through the various operations that would otherwise have to be put into each individual program. Many modifications and variations are apparent from the foregoing description of the invention and all such modifications and variations are intended to be within the scope of the present invention.

I claim:

1. A method of electronic composition for electronically ordering logical pages onto physical pages printed by a printer, comprising the steps of:
   a) determining the number of physical pages in a signature and the pattern in which logical pages will be imposed on the physical pages;
   b) based on the pattern determined in step a, selecting a seed table having an entry for each position of the pattern;
   c) electronically ordering the logical pages by assigning a logical page to each position of each physical page based on the place of each physical page in the sequence of physical pages and the entry in the seed table corresponding to the pattern position contemplated, by first determining whether the corresponding seed table entry is positive, and then by assigning logical pages based on the following algorithm:

Positive Entry: Logical Page =

Entry * (total number of physical pages/signature) −

(number of physical pages following the current physical page in sequence);

Else:

Logical Page = abs(Entry) * (total number of physical pages/signature) −

(number of physical pages preceding the current physical page in sequence);

and d) printing the logical pages in the assigned positions on the physical pages.

* * * * *